United States Patent
Imanishi

(10) Patent No.: US 7,577,950 B2
(45) Date of Patent: Aug. 18, 2009

(54) DATABASE UPDATE METHOD AND APPARATUS USING OPTICAL DISK WITH LIMITED CONTENT LIFETIME

(75) Inventor: Shunichi Imanishi, Torrance, CA (US)

(73) Assignee: Alpine Electronics, Inc., Tokyo (JP)

(*) Notice: Subject to any disclaimer, the term of this patent is extended or adjusted under 35 U.S.C. 154(b) by 880 days.

(21) Appl. No.: 11/095,158

(22) Filed: Mar. 31, 2005

(65) Prior Publication Data

US 2006/0227672 A1 Oct. 12, 2006

(51) Int. Cl.
*G06F 9/445* (2006.01)
(52) U.S. Cl. .................................... 717/169; 717/175
(58) Field of Classification Search ............. None
See application file for complete search history.

(56) References Cited

U.S. PATENT DOCUMENTS 6,600,993 B1* 7/2003 Kaneko et al. ............... 701/208
2004/0037994 A1* 2/2004 Bakos et al. ............... 428/64.4

* cited by examiner

Primary Examiner—Chuck O Kendall
(74) Attorney, Agent, or Firm—Muramatsu & Associates

(57) ABSTRACT

A navigation system allows to copy the data in the optical disk for updating a database of the navigation system with use of an optical disk while prohibiting the illegal copying of the optical disk. The navigation system uses an optical disk specially made so that it becomes unreadable after a predetermined time. The navigation system inhibits copying of the data on the optical disk by prohibiting a user from unloading the optical disk from the CD/DVD driver when the data on the optical disk is still readable. To measure a predetermined time length for the optical disk becomes unreadable, the navigation system starts a timer when the optical disk is installed in the navigation system.

20 Claims, 5 Drawing Sheets

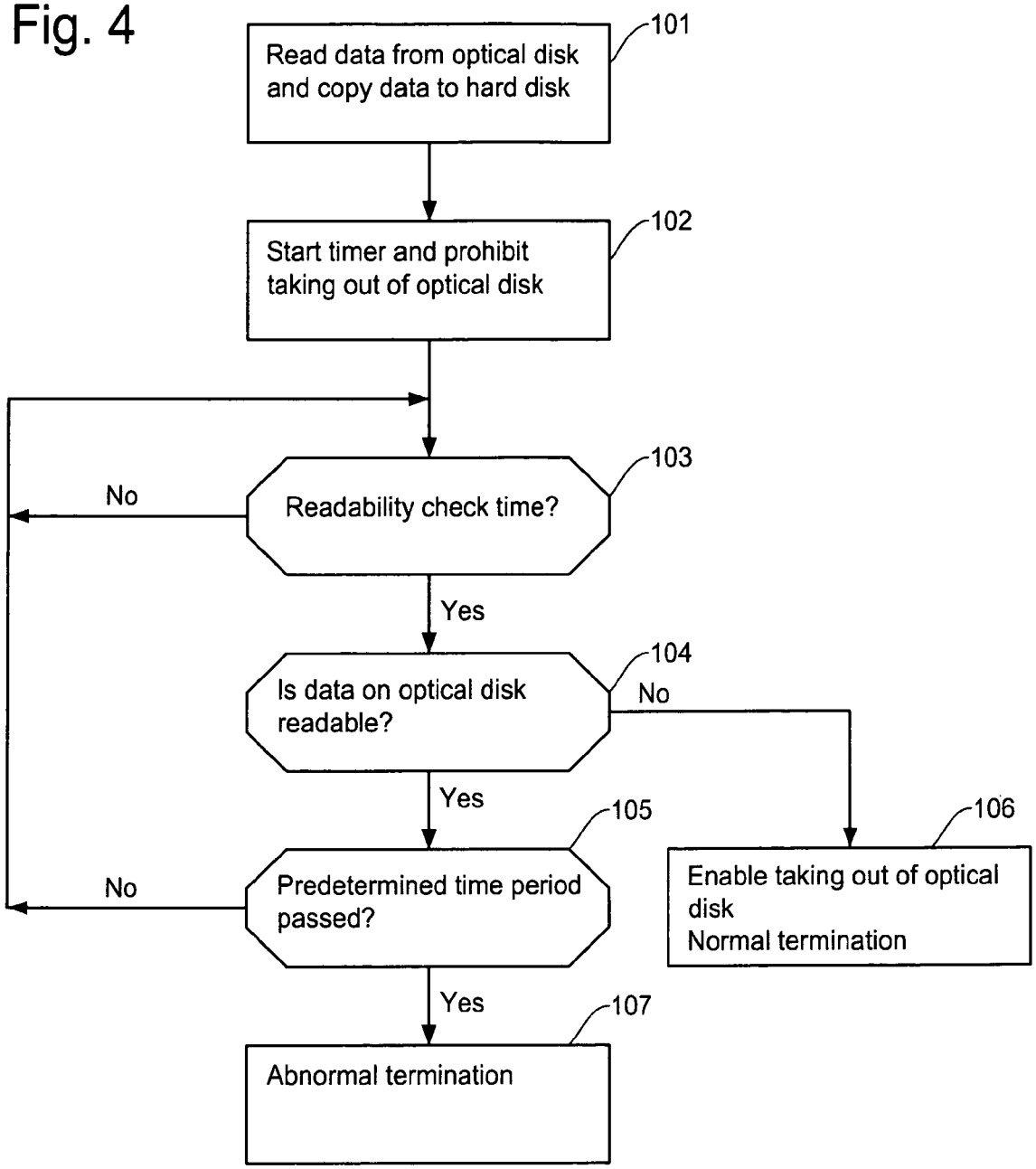

DATABASE UPDATE METHOD AND APPARATUS USING OPTICAL DISK WITH LIMITED CONTENT LIFETIME

FIELD OF THE INVENTION

This invention relates to a method of updating a database of a navigation system with use of an optical storage media, and more particularly, to a method and apparatus for updating a database of a navigation system by copying updated data from an optical storage media that becomes unreadable after a predetermined time to data storage medium of the navigation system while prohibiting the optical storage media from coming out until the optical storage media becomes unreadable.

BACKGROUND OF THE INVENTION

A navigation system performs travel guidance for enabling a user to easily and quickly reach the selected destination. A typical example is a vehicle navigation system where a vehicle of a user is equipped with a navigation function. Such a navigation system detects the position of the user or user's vehicle, and reads out map data pertaining to an area at the current vehicle position from a data storage medium, for example, a hard disk. The navigation system displays a map image on a monitor screen while superimposing a mark representing the current location of the user on the map image.

When a destination is set, the navigation system starts a route guidance function for setting a guided route from the start point to the destination. To determine the guided route to the destination, the navigation system calculates and determines an optimum route to the destination based on various parameters. For example, the guided route is determined based on the shortest way to reach the destination, the quickest way to reach the destination, the route preferring freeways to surface roads, the least expensive way to the destination, the route without using toll road, or the like.

As new roads and buildings are constantly constructed, it becomes necessary to sometimes update the map data in the database of the navigation system so that it can accurately provide the most current information and guidance to the user. Moreover, it may also become necessary to upgrade the software and firmware of the navigation system as well for improving its performances. One method of updating/upgrading the navigation system is to allow only manufactures and authorized dealers to update the navigation system. However, this method has a problem of incurring higher cost and longer time because the user has to send the navigation system or the vehicle equipped with the navigation system to the manufacturer or dealer.

One way to update such data is to provide an update DVD or CD to copy the content of the optical medium into a rewritable media such as a hard disk drive of the navigation system. Nowadays, many vehicles have a DVD or CD entertainment system in combination with a navigation system. Thus, it is possible to provide a DVD or CD disk with updated data to a user of a navigation system so that the user can install the updated data in a hard disk of the navigation system through a CD/DVD driver of the entertainment system. This way of updating the map data or other data has the advantage of relatively low cost and short time in implementation.

However, the DVD or CD disk with the updated data can be sold or rent to others after the authorized user has installed the data in the hard disk of the navigation system. This is because once the data from the disk is installed, the operation of the navigation system does not depend on the presence of the disk. In other words, the user does not have to keep the disk after the installation. As a result, an unauthorized user may use those disks to install the updated data to their navigation systems.

To avoid such an act of unauthorized sale or copying of the updated data, an optical disk with a limited lifetime is proposed. In such an optical disk, because of the chemical action, the surface of the optical disk changes after unpacking within a certain amount of time, such as several hours or several ten hours, thereby disabling to copy the data. However, even if such an optical disk is used, it is possible to make illegal copying before the optical disk becomes unreadable.

Thus, there is a need to provide a navigation system that can prevent illegal copying while achieving a sufficient time to update the data for an authorized buyer with a relatively easy operation.

SUMMARY OF THE INVENTION

It is, therefore, an object of the present invention to provide a method and apparatus for updating map data in a hard disk of a navigation system of an authorized use while prohibiting unauthorized sale or copying of updated data.

It is another object of the present invention to provide a method and apparatus for updating data in a hard disk of a navigation system with use of an optical disk specially made in such a way that the content data becomes unreadable after passage of predetermined time length.

It is a further object of the present invention to provide a method and apparatus for updating data in a hard disk of a navigation system with use of an optical disk the content data of which becomes unreadable after passage of predetermined time length while preventing removal of the optical disk during the predetermined time length.

One aspect of the present invention is a method of updating a navigation system by copying updated data to a hard disk of the navigation system. The method is comprised of the steps of: installing an optical disk in an optical disk driver where the optical disk is specially made in such a way that content data becomes unreadable after passage of a predetermined time length; reading the data from the optical disk and copying the data in the hard disk of the navigation system; prohibiting taking out of the optical disk from the optical disk driver by keeping closing the optical disk driver; starting a timer to monitor a time passage with respect to the predetermined time length; and enabling to open the optical disk driver for removal of the optical disk therefrom after receiving an end signal from the timer indicating an end of the predetermined time length.

The method of the present invention further includes the steps of: periodically checking readability of the optical disk to determine whether the optical disk has undergone a change such that the data in the optical disk cannot be read any longer; and enabling to open the optical disk driver for removal of the optical disk therefrom when the data in the optical disk is not readable before receiving the end signal from the timer.

The method of the present invention further includes the steps of: checking readability of the optical disk after the passage of the predetermined time length to determine whether the data in the optical disk is readable; and terminating a procedure for updating the navigation system as an abnormal termination when the data in the optical disk is still readable after the passage of the predetermined time. In such a case, the navigation system disables to use the data installed in the hard disk of the navigation system or to open the optical disk driver.

During the step of prohibiting taking out of the optical disk from the optical disk driver, the method further includes the steps of: receiving a request by a user to open the optical disk driver, and displaying an identification number unique to the user when the user removes the optical disk from the optical disk driver. In such a case, the method further includes the step of disallowing the data stored in the hard disk of the navigation system either by erasing the data or denying access to the data. Further, the method includes the steps of installing a replacement optical disk from an authorized supplier of the optical disk which includes an identification number unique to the user; comparing the identification number of the replacement optical disk and the identification number indicated by the navigation system; and reading the data from the replacement optical disk and copying the data in the hard disk of the navigation system when the two identification numbers match with one another.

The method of the present invention further includes the steps of: periodically checking readability of the optical disk to determine whether the optical disk has undergone a change such that the data in the optical disk cannot be read any longer; and evaluating whether a time length when the data in the optical disk has become unreadable is abnormally shorter than the predetermined time length; and terminating a procedure for updating the navigation system as an abnormal termination when the data in the optical disk has become unreadable at the abnormally short time.

Another aspect of the present invention is an apparatus for updating a navigation system by copying updated data to a hard disk of the navigation system. The apparatus is configured to implement the various steps defined in the method of the present invention described above. The navigation system inhibits copying of the data on the optical disk by disallowing the user to unload the optical disk from the CD/DVD driver when the data on the optical disk is still readable.

According to the invention, an optical disk that is specially made in such a way that the readability of the optical disk is destroyed after a predetermined time is used for updating the data in the navigation system. The navigation system of the present invention inhibits copying of the data on the optical disk by prohibiting a user from unloading the optical disk from the CD/DVD driver when the data on the optical disk is still readable.

The navigation system also provides a mechanism to disable the data installed in the navigation system when it determines that the data may have been illegally copied. The navigation system also provides a mechanism to allow the user to copy the data in the new optical disk if a special procedure is satisfied. Therefore, the method and apparatus of the present invention is capable of updating the map data in the hard disk of the navigation system while prohibiting unauthorized sale or copying of updated data.

BRIEF DESCRIPTION OF THE DRAWINGS

FIG. 2A shows the condition where a disk tray is opened to allow loading and unloading of an optical disk, and FIG. 2B shows the condition where the disk tray is closed.

FIG. 3A shows the condition where the data in the optical disk is readable, and FIG. 3B shows the condition where the data is broken.

FIG. 4 is a flowchart showing the operational flow of the present invention for installing an optical disk for updating map data in the navigation system where the optical disk with limited content lifetime is used.

DETAILED DESCRIPTION OF THE INVENTION

The present invention will be described in detail with reference to the accompanying drawings. It has been proposed an optical storage media that becomes unreadable after being exposed to air for a predetermined time. One such an example is disclosed in U.S. Pat. No. 6,641,886 in which readability of an optical disk is destroyed after a predetermined time by changes of surface of the optical disk by chemical reaction. In order to prevent copying of DVD for data update by unauthorized users, use of such a read inhibitable disk (hereafter may also be called "time erasable optical disk") for updating the navigation system can be beneficial to prevent illegal copying.

However, a time for copying the updated data from the optical disk to a rewritable storage such as a hard disk of the navigation system is much shorter than the time it takes for the optical disk to become unreadable. Thus, there is still a possibility that the unauthorized users may copy the disk for their navigation systems. The navigation system of the present invention inhibits copying the data on an optical disk (ex. DVD) by prohibiting a user from unloading the optical disk from the DVD driver when the data on the optical disk is still readable. The navigation system also provides a mechanism to disable the data installed in the navigation system when it determines that the data may be illegally copied.

Figure 1:
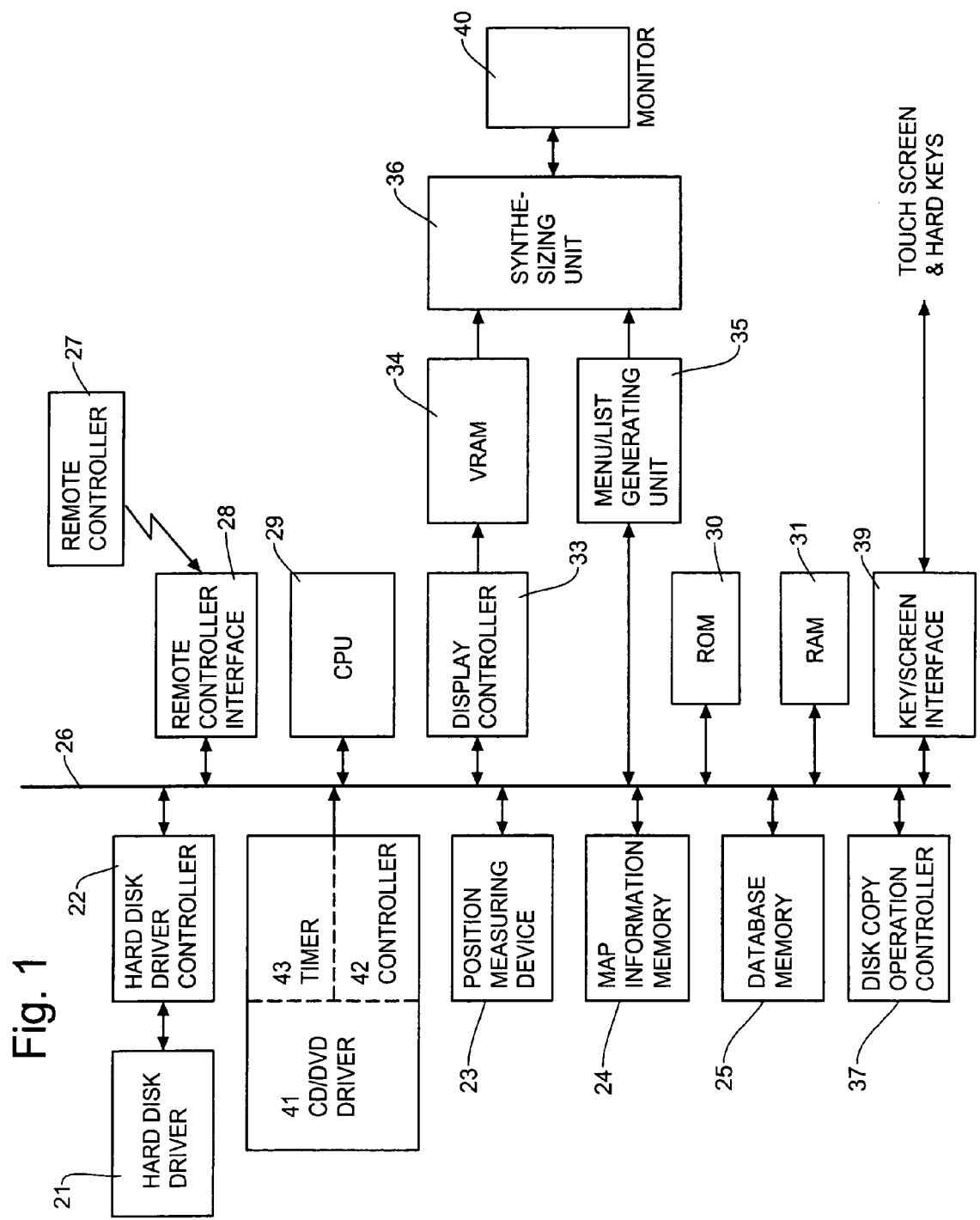
FIG. 1 is a block diagram showing an example of structure of the vehicle navigation system for implementing the present invention.

FIG. 1 shows an example of structure of a vehicle navigation system implementing the present invention. In the block diagram of FIG. 1, the navigation system includes a rewritable storage, typically a hard disk driver 21 for storing map information, a hard disk driver controller 22 for controlling an operation for reading the map information from the hard disk driver 21, a position measuring device 23 for measuring the present vehicle position. The position measuring device 23 has a vehicle speed sensor for detecting a moving distance, a gyroscope for detecting a moving direction, a microprocessor for calculating a position, a GPS (Global Positioning System) receiver, and etc.

A CD/DVD driver 41 is primarily used to play a CD (compact disk) or a DVD (digital versatile disk), and to update the data in the hard disk. The CD/DVD driver 41 has an opening for loading or unloading a CD or a DVD to play music, movie, etc. The CD/DVD driver 41 includes a driver controller 42 which controls an operation of the CD/DVD driver 41 and a timer 43 to measure passage of time when an optical disk of the read inhibit function (time erasable optical disk) is loaded in the CD/DVD driver 41. The CD/DVD driver 41 is controlled so that the optical medium will not be ejected from the CD/DVD driver 41 until the optical medium becomes unreadable.

The block diagram of FIG. 1 further includes a map information memory 24 for storing the map information which is read out from the hard drive 21, a database memory 25 for storing database information such as point of interest (POI) information which is read out from the hard drive 21, a remote controller 27 for executing a menu selection operation, an enlarge/reduce operation, a destination input operation, etc. and a remote controller interface 28. The navigation system may include various other input methods to achieve the same and similar operations done through the remote controller.

The navigation system further includes a bus 26 for interfacing the above units in the system, a processor (CPU) 29 for controlling an overall operation of the navigation system, a ROM 30 for storing various control programs, a RAM 31 for storing a processing result such as a guide route, a voice interface and guiding unit 32 for voice communication interface and spoken instructions, a display controller 33 for generating a map image (a map guide image and an arrow guide image) on the basis of the map information, a VRAM (video RAM) 34 for storing images generated by the display controller, a menu/list generating unit 35 for generating menu image/various list images, a synthesizing unit 36, a monitor (display) 40 and a key and screen interface 39 for interfacing with various other input means such as hard keys and a joystick on a panel of the navigation system.

The block diagram of FIG. 1 further includes a disk copy operation controller 37 which detects whether a time erasable optical disk is inserted in the CD/DVD driver 41. The disk copy operation controller 37 controls an overall operation of updating the map data in the hard disk with use of the time erasable optical disk. As will be described in detail later, the disk copy operation controller 37 prohibits removal of the optical disk until the data in the optical disk becomes unreadable.

Ordinarily, the CD/DVD driver 41 is used for reproducing music and movie for entertainment purpose with use of the monitor 40. In a preferred embodiment, the CD/DVD driver 41 is also used to copy the updated map data in a time erasable optical disk to the hard disk driver 21. When the time erasable optical disk for updating the map data for the navigation system is installed, the navigation system performs the data updating procedure under the control of the disk copy operation controller 37.

Namely, the disk copy operation controller 37 detects whether the time erasable optical disk is loaded on the CD/DVD driver 41. It is assumed that the time erasable optical disk has an identification code which includes information that the disk has a limited content lifetime. Thus, by reading the identification code, the disk copy operation controller 37 instructs the CD/DVD driver 41 to close the disk tray and also instructs the timer 43 to start counting the time.

During the period when the timer is counting the time, the CD/DVD driver 41 remains closed so that the user cannot take out the time erasable optical disk from the CD/DVD driver 41. Thus, even when the installation of the new map data in the hard disk is completed, the CD/DVD driver 41 will not eject the optical disk until the timer 43 produces an end signal after a predetermined time length. The predetermined time length for the timer to produce the end signal is determined by the disk copy operation controller 37 based on the information from the time erasable optical disk. The disk copy operation controller 37 periodically checks readability of the time erasable optical disk.

Figure 2A:
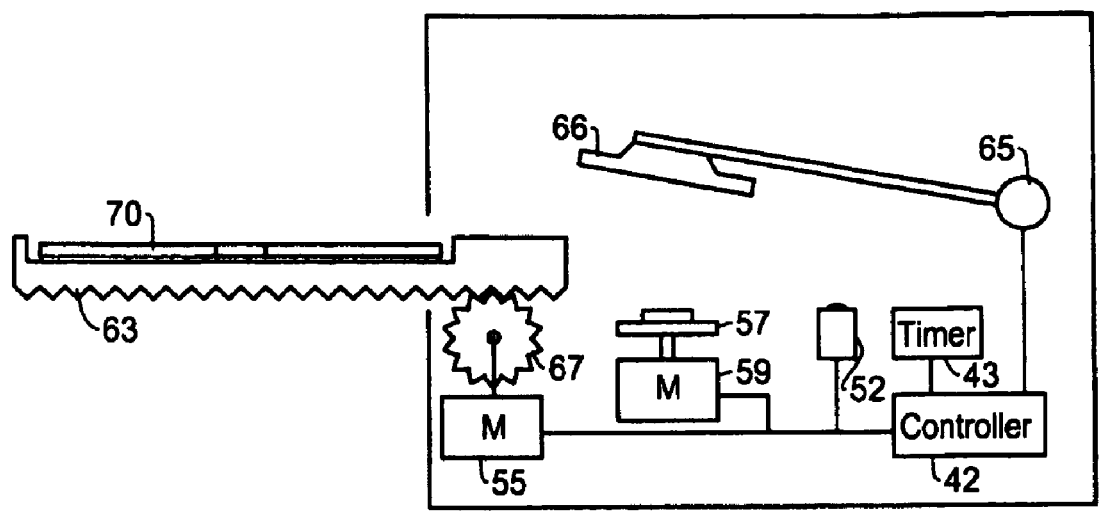
FIGS. 2A and 2B are schematic diagrams showing an example of structure of a CD/DVD driver for implementing the present invention.
Figure 2B:
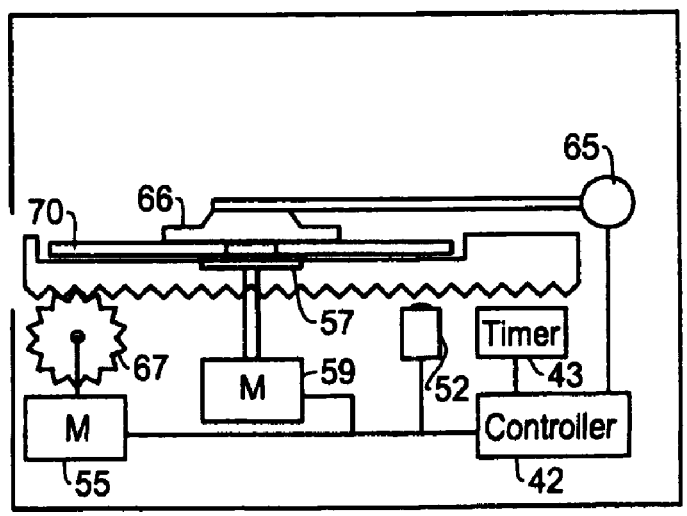

FIGS. 2A and 2B are schematic diagrams showing an example of structure of the CD/DVD driver 41 having the driver controller 42 and the timer 43 for implementing the present invention. In the example of FIGS. 2A and 2B, in addition to the controller 42 and the timer 43 noted above, the CD/DVD driver 41 includes an optical pickup 52, a gear motor 55, a turntable motor 59, a turn table 57, a disk tray 63, a damper joint 65, a damper 66, and a gear wheel 67. An optical disk 70 such as an ordinary CD or DVD or a time erasable optical disk will be mounted on the disk tray 63.

FIG. 2A shows the condition where the disk tray 63 is open to allow loading and unloading of the optical disk 70. The disk tray 63 has gears that fit with the gear wheel 67. The gear motor 55 drives the gear wheel 67 to move the disk tray 63 forward and backward. When being moved forward, the disk tray 63 is outside (open) the CD/DVD driver so that the optical disk 70 can be removed. The turn table 57 is rotated by the turntable motor 59, which rotates the optical disk 70 on the turntable 57. The optical pickup 52 provides laser beam on the optical disk 70 and receives the reflected laser beam, thereby reading data on the optical disk 70 as is well known in the art. The timer 43 counts the clock to ensure that the predetermined time has passed so that the optical disk becomes unreadable. The driver controller 42 controls an overall operation of the CD/DVD driver 41 under the control of the disk copy operation controller 37.

FIG. 2B shows the condition wherein the disk tray 63 is moved backward (close) and is inside of the CD/DVD driver 41. The damper 66 comes down to contact the upper surface of the optical disk 70. The turn table 57 goes up to contact with the lower surface of the optical disk 70. Thus, the optical disk 70 is stabilized and rotated as necessary for data readout. Even after reading all of the new data from the optical disk and copying the new data to the hard disk of the navigation system, the timer 43 will not produce the end signal during the prescribed time necessary for erasing the data on the optical disk. Thus, the optical disk 70 will not come out from the CD/DVD driver 41 during the prescribed time, thereby preventing illegal copying.

Figure 3A:
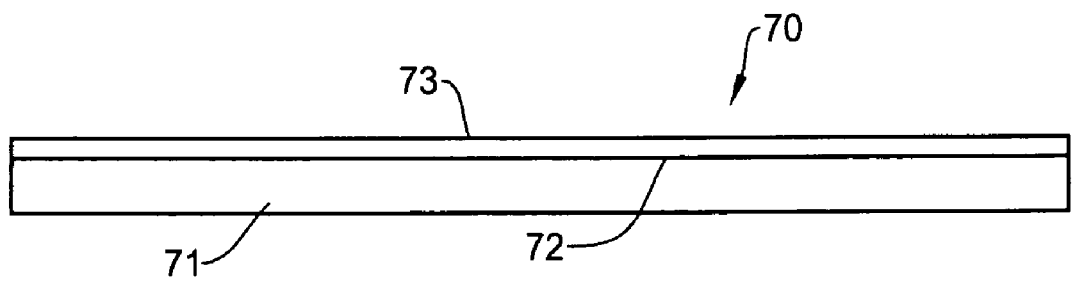
FIGS. 3A and 3B are schematic diagrams showing an example of cross sectional structure of an optical disk to be used in the present invention where the optical disk becomes unreadable after a certain amount of time.
Figure 3B:
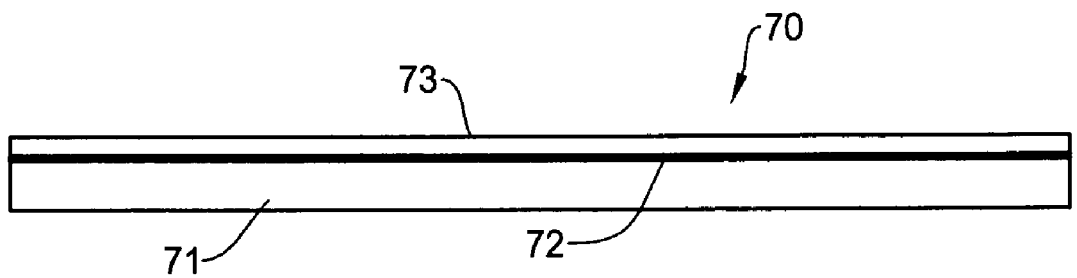

FIGS. 3A and 3B show examples of an optical disk to be used in the present invention. This type of optical disk becomes unreadable after a certain amount of time has passed because of the chemical change on the surface of the disk. The optical disk 70 includes a substrate 71, data encoded component 72, and a lacquer layer 73. After being unpacked from an air-tight container, the data encoded component 72 is chemically treated such that it becomes optically non-reflective after certain amount of time has passed.

FIG. 3A shows the condition where the data encoded component 72 on the disk 70 is optically reflective, and thus, the navigation system can read the data from the optical disk 70. FIG. 3B shows the condition where the data encoded component 72 is optically non-reflective because of the chemical changes. As noted above, the navigation system in the present invention disallows unloading of the optical disk until the optical disk becomes unreadable as in the condition of FIG. 3B.

Referring to FIG. 4, an example of process of installing the updated data or software in the navigation system is described in detail. In this example, the optical disk used in the present invention is a time erasable disk as described with reference to FIGS. 3A-3B. First, the user places the optical disk on the disk tray 63 (FIG. 2A) when the disk tray 63 is moved forward to the outside of the CD/DVD driver 41 (open).

In step 101, the navigation system reads the data from the optical disk and copies the data in the hard disk of the navigation system, thereby updating the map data. In addition to the map data, the data to be recorded in the hard drive may include upgraded software, etc. When the data retrieved from the optical disk is recorded in the hard disk, the navigation system starts a timer 43 for a predetermined time length in step 102. When the timer 43 starts, the driver controller 42 prohibits the CD/DVD driver 41 to open until the end signal from the timer 43 is received.

In a preferred embodiment, the predetermined time is set to be the maximum time for the optical disk to become unreadable. For example, if the optical disk is designed to become unreadable after 72 hours, the predetermined time is set to be 72 hours. For example, the timer 43 starts as soon as the disk tray 63 returns to the inside of the CD/DVD driver 41, or immediately after the data reading operation is started, or after all of the necessary data is copied in the hard disk of the navigation system.

Thus, during this period, the user cannot take out the optical disk until the navigation system determines that the procedure reached a normal termination as will be explained in detail later. Even after the installation is completed, the user cannot take out the optical disk because the optical disk is still readable for the predetermined period of time. This prohibits the user from lending the optical disk to others, thereby preventing illegal copying.

In step 103, the navigation system checks if the optical disk is still readable, such as every 10 minutes. Thus, the optical pickup 52 checks readability of the optical disk in response to the instruction from the disk copy operation controller 37 (FIG. 1) and the driver controller 42. In the alternative, the navigation system checks the readability of the optical disk in such a way that the interval at the beginning is relatively large compared to the interval later. For example, the readability check may be conducted every one hour for the first 24 hours, and the interval becomes 10 minutes at a later time.

In step 104, the navigation system checks whether the data on the optical disk is still readable. If the optical disk is no longer readable at step 104, the navigation system allows to open the CD/DVD driver 41 in step 106 because there is no likelihood of illegal copying. That is, in the example in FIGS. 2A and 2B, the controller 42 allows the motor 55 to drive the gear 67 to move the disk tray 63 to the outside (open) of the CD/DVD driver 41. Thus, the user can remove and discard the optical disc.

On the other hand, if the optical disk is still readable at step 104, the navigation system checks if the predetermined time period has passed in step 105. For example, if the predetermined time period for the timer that started in step 102 is 72 hours, the navigation system checks whether the 72 hours have passed since the timer started in step 102. If the predetermined time period has not passed, the process goes back to the step 103 to repeat the steps 103-105 described above.

In the case where the predetermined time period has already passed in step 105, the navigation terminates the procedure as an abnormal termination in step 107. The process ends as an abnormal termination because the optical disk should have become unreadable by the time the predetermined time period has passed. Accordingly, there is a chance that the optical disk is defective. In this case, the navigation system may prohibit taking out the optical disk, or it may lock the data in the hard disk so that the installed data becomes unusable. The navigation system may, in the alternative, prevent taking out the optical disk until the user contacts a customer service department of the optical disk manufacturer to obtain a lock-release code (ex. ID) which is input to the navigation system.

Thus, the navigation system prevents illegal copying by prohibiting taking out the optical disk until the optical disk becomes unreadable. When the car ignition is turned off during the time when the timer is running (monitor mode), the navigation system continues the timer with use of a battery power. The navigation system may perform the readability check in the steps 103 and 104 in the monitor mode while the car ignition is turned off.

There may be a case where the user must take out the optical disk during the timer mode, i.e, the predetermined time period noted above. For example, the user wants to play a CD or DVD for an entertainment purpose, or may have to install updated data before proceeding with the map data update by using time erasable optical disk. For such situations, the navigation system may provide an ID rescue system that works in the following manner, as provided in FIG. 5A and 5B.

Figure 5A:
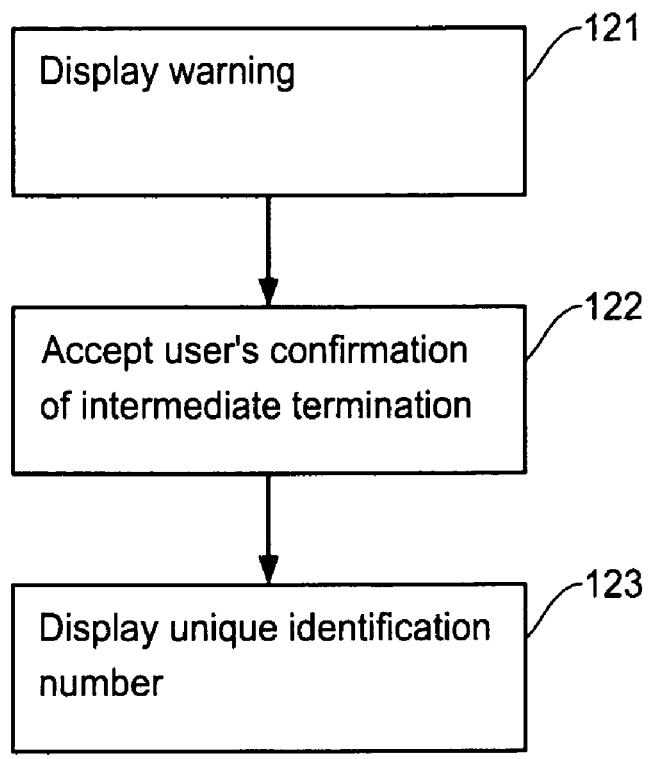
FIGS. 5A and 5B are flowcharts showing the operational procedure in the navigation system of the present invention where the user takes out an optical disk and the navigation system issues an identification number, and the user installs a new optical disk after the navigation system confirms the identification number.

Referring to FIG. 5A, the navigation system gives warning to the user when the user attempts to open the CD/DVD driver in step 121. The warning may indicate that re-installation may take extra cost, etc. The user may confirm the action to take out the optical disk at step 122. Then, at step 123, the navigation system displays a unique identification number on the screen and disables the data installed in the navigation system. The navigation system may erase the data installed in the hard drive, or it may prevent access to that data.

The user can inform the identification number to the manufacturer of the optical disk to obtain a new optical disk which is time erasable that can only be used for the particular navigation system with the particular identification number. Because the optical disk is specially manufactured for the navigation system with the unique identification number, the optical disk will not work for other navigation systems. Thus, the user can start the data update process with use of the new optical disk.

Figure 5B:
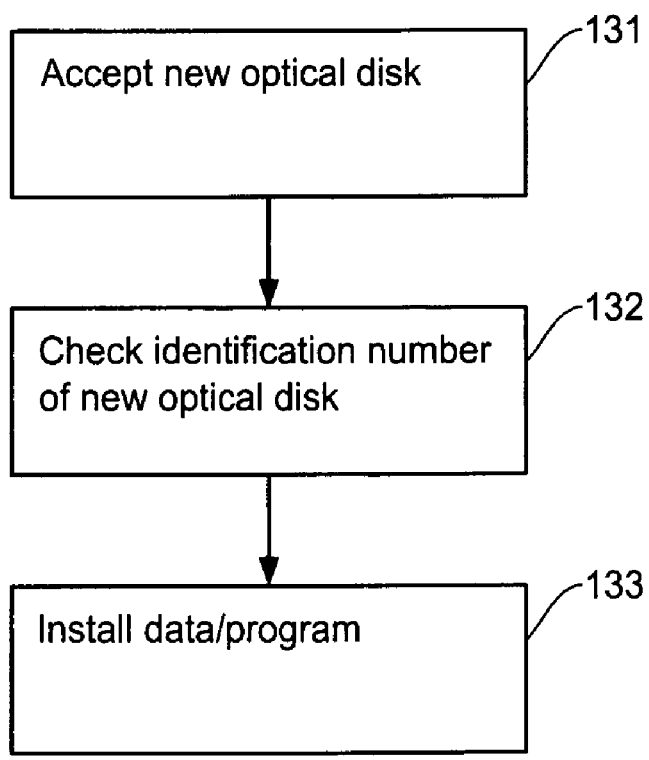

Referring to FIG. 5B, the user can insert the optical disk with the unique identification number in the CD/DVD driver 41 to install the data in the hard disk. The navigation system accepts the optical disk in step 131. Then, the navigation system checks the identification number of the optical disk to determine if it matches the identification number in the navigation system at step 132. When the identification numbers match, the navigation system copies the data from the optical disk to the hard disk in step 133. Thus, the process described with reference to in FIG. 4 is conducted for the new optical disk. Accordingly, illegal copying to other navigation systems can be prevented and only the authorized user can copy the updated map data from the time erasable optical disk.

The navigation system may provide a mechanism to expedite the chemical process of the DVD to make it unreadable sooner. For example, the navigation system may apply a strong laser beam or a high voltage to the time erasable optical disk as soon as the time mode starts. Alternatively, the navigation system may spray an oxygen on the optical disk to promote the chemical changes on the surface of the optical disk.

In the foregoing example, the present invention aimed to prevent unloading of an optical disk until it becomes unreadable. If the optical disk becomes unreadable in too short a time, there is a chance that the data in the optical disk has been previously used. Thus, the current copying may be illegal. The navigation system may end the procedure by flagging abnormal termination.

For example, if the optical disk is designed to become unreadable after 72 hours from unpacking, but the navigation system detects that the optical disk has become unreadable only in 20 hours. Since the optical disk became the read-inhibited state in a substantially shorter time than normally would, the navigation system will issue an abnormal termination. The navigation system may have a predetermined threshold time to determine if the time the disk becomes unreadable is substantially shorter than normal. In such a case, the navigation system may lock the installed data so that the installed data cannot be used.

As has been described above, according to the present invention, an optical disk that is specially made in such a way that the readability of the optical disk is destroyed after a predetermined time is used for updating the data in the navigation system. The navigation system of the present invention inhibits copying of the data on the optical disk by prohibiting a user from unloading the optical disk from the CD/DVD driver when the data on the optical disk is still readable.

The navigation system also provides a mechanism to disable the data installed in the navigation system when it determines that the data may have been illegally copied. The navigation system also provides a mechanism to allow the user to copy the data in the new optical disk if a special procedure is satisfied. Therefore, the method and apparatus of the present invention is capable of updating the map data in the hard disk of the navigation system while prohibiting unauthorized sale or copying of updated data.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of updating a navigation system by copying updated data to a rewritable storage of the navigation system, comprising the following steps of:
    installing an optical disk in an optical disk driver where the optical disk is specially made in such a way that content data becomes unreadable after passage of a predetermined time length;
    reading the data from the optical disk and copying the data in the rewritable storage of the navigation system;
    prohibiting from taking out of the optical disk from the optical disk driver by keeping closing the optical disk driver;
    starting a timer to monitor a time passage with respect to the predetermined time length;
    periodically checking readability of the data from the optical disk to determine whether the optical disk has undergone a change such that the data in the optical disk cannot be read any longer; and
    enabling to open the optical disk driver for removal of the optical disk therefrom after receiving an end signal from the timer indicating an end of the predetermined time length.

2. A method of updating a navigation system as defined in claim 1, further comprising the step of:
    enabling to open the optical disk driver for removal of the optical disk therefrom when the data in the optical disk is not readable before receiving the end signal from the timer.

3. A method of updating a navigation system as defined in claim 1, further comprising the steps of:
    checking readability of the data from the optical disk after the passage of the predetermined time length to determine whether the data in the optical disk is readable; and
    terminating a procedure for updating the navigation system as an abnormal termination when the data in the optical disk is still readable after the passage of the predetermined time.

4. A method of updating a navigation system as defined in claim 3, the step of terminating the procedure for updating the navigation system in the abnormal termination includes a step of disabling to use the data installed in the rewritable storage of the navigation system.

5. A method of updating a navigation system as defined in claim 3, the step of terminating the procedure for updating the navigation system in the abnormal termination includes a step of disabling to open the optical disk driver, thereby prohibiting removal of the optical disk therefrom.

6. A method of updating a navigation system as defined in claim 1, the step of prohibiting from taking out of the optical disk from the optical disk driver includes the steps of:
    receiving a request by a user to open the optical disk driver, and
    displaying an identification number unique to the user when the user removes the optical disk from the optical disk driver.

7. A method of updating a navigation system as defined in claim 6, further comprising the step of disallowing the data stored in the rewritable storage of the navigation system either by erasing the data or denying access to the data.

8. A method of updating a navigation system as defined in claim 7, further comprising the steps of:
    installing a replacement optical disk from an authorized supplier of the optical disk which includes an identification number unique to the user;
    comparing the identification number of the replacement optical disk and the identification number indicated by the navigation system; and
    reading the data from the replacement optical disk and copying the data in the rewritable storage of the navigation system when the two identification numbers match with one another.

9. A method of updating a navigation system as defined in claim 1, further comprising the steps of:
    evaluating whether a time length when the data in the optical disk has become unreadable is abnormally shorter than the predetermined time length; and
    terminating a procedure for updating the navigation system as an abnormal termination when the data in the optical disk has become unreadable at the abnormally short time.

10. A method of updating a navigation system as defined in claim 9, the step of terminating the procedure for updating the navigation system in the abnormal termination includes a step of either disabling to use the data installed in the rewritable storage of the navigation system or disabling to open the optical disk driver for removing the optical disk therefrom.

11. An apparatus for updating a navigation system by copying updated data to a rewritable storage of the navigation system, comprising:
    means for installing an optical disk in an optical disk driver where the optical disk is specially made in such a way that content data becomes unreadable after passage of a predetermined time length;
    means for reading the data from the optical disk and copying the data in the rewritable storage of the navigation system;
    means for prohibiting from taking out of the optical disk from the optical disk driver by keeping closing the optical disk driver;
    means for periodically checking readability of the data from the optical disk to determine whether the optical disk has undergone a change such that the data in the optical disk cannot be read any longer;
    means for starting a timer to monitor a time passage with respect to the predetermined time length; and
    means for enabling to open the optical disk driver for removal of the optical disk therefrom after receiving an end signal from the timer indicating an end of the predetermined time length.

12. An apparatus for updating a navigation system as defined in claim 11, further comprising:
   means for enabling to open the optical disk driver for removal of the optical disk therefrom when the data in the optical disk is not readable before receiving the end signal from the timer.

13. An apparatus for updating a navigation system as defined in claim 11, further comprising:
   means for checking readability of the optical disk after the passage of the predetermined time length to determine whether the data in the optical disk is readable; and
   means for terminating a procedure for updating the navigation system as an abnormal termination when the data in the optical disk is still readable after the passage of the predetermined time.

14. An apparatus for updating a navigation system as defined in claim 13, the means for terminating the procedure for updating the navigation system in the abnormal termination includes means for disabling to use the data installed in the rewritable storage of the navigation system.

15. An apparatus for updating a navigation system as defined in claim 13, the means for terminating the procedure for updating the navigation system in the abnormal termination includes means for disabling to open the optical disk driver, thereby prohibiting removal of the optical disk therefrom.

16. An apparatus for updating a navigation system as defined in claim 11, the means for prohibiting from taking out of the optical disk from the optical disk driver includes:
   means for receiving a request by a user to open the optical disk driver, and
   means for displaying an identification number unique to the user when the user removes the optical disk from the optical disk driver.

17. An apparatus for updating a navigation system as defined in claim 16, further comprising means for disallowing the data stored in the rewritable storage of the navigation system either by erasing the data or denying access to the data.

18. An apparatus for updating a navigation system as defined in claim 17, further comprising:
   means for installing a replacement optical disk from an authorized supplier of the optical disk which includes an identification number unique to the user;
   means for comparing the identification number of the replacement optical disk and the identification number indicated by the navigation system; and
   means for reading the data from the replacement optical disk and copying the data in the rewritable storage of the navigation system when the two identification numbers match with one another.

19. An apparatus for updating a navigation system as defined in claim 11, further comprising:
   means for evaluating whether a time length when the data in the optical disk has become unreadable is abnormally shorter than the predetermined time length; and
   means for terminating a procedure for updating the navigation system as an abnormal termination when the data in the optical disk has become unreadable at the abnormally short time.

20. An apparatus for updating a navigation system as defined in claim 19, the means for terminating the procedure for updating the navigation system in the abnormal termination includes means for either disabling to use the data installed in the rewritable storage of the navigation system or disabling to open the optical disk driver for removing the optical disk therefrom.

* * * * *